US011686476B2

(12) United States Patent
Moon et al.

(10) Patent No.: US 11,686,476 B2
(45) Date of Patent: Jun. 27, 2023

(54) COOKING APPLIANCE

(71) Applicant: Samsung Electronics Co., Ltd., Suwon-si (KR)

(72) Inventors: Byoung Hoon Moon, Yongin-si (KR); See Hyun Kim, Suwon-si (KR); Dae Han Bang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/503,638

(22) Filed: Oct. 18, 2021

(65) Prior Publication Data

US 2022/0034513 A1 Feb. 3, 2022

Related U.S. Application Data

(63) Continuation of application No. 16/474,334, filed as application No. PCT/KR2017/014213 on Dec. 6, 2017, now Pat. No. 11,149,956.

(30) Foreign Application Priority Data

Jan. 3, 2017 (KR) ......................... 10-2017-0000958

(51) Int. Cl.
  *F24C 3/12* (2006.01)
  *F16K 31/44* (2006.01)
  *F24C 3/10* (2006.01)

(52) U.S. Cl.
  CPC .............. *F24C 3/122* (2013.01); *F16K 31/44* (2013.01); *F24C 3/10* (2013.01)

(58) Field of Classification Search
  CPC ......... H01H 3/0206; F16K 1/50; F16K 31/44; F24C 3/122; F24C 3/10
  (Continued)

(56) References Cited

U.S. PATENT DOCUMENTS 3,971,904 A * 7/1976 Ward ................... H01H 3/0206
  200/569
5,537,893 A   7/1996 Snider
  (Continued)

FOREIGN PATENT DOCUMENTS

KR   20-0203189 Y1   11/2000
KR   20-0443918 Y1   3/2009
  (Continued)

OTHER PUBLICATIONS

International Search Report dated Mar. 21, 2018 in connection with International Patent Application No. PCT/KR2017/014213, 2 pages.
  (Continued)

*Primary Examiner* — Vivek K Shirsat

(57) ABSTRACT

The present disclosure relates to a cooking appliance including a valve holder assembly for preventing movement of a valve. The cooking appliance includes a main body including a heating part, a valve positioned at least partially inside the main body to supply fuel to the heating part, and a knob unit coupled to the main body to regulate the degree of opening and closing of the valve, wherein the knob unit includes an operating part provided on a front surface of the main body to be operable and to which the valve is coupled at least partially, and a valve holder assembly positioned at the rear of the operating part, and the valve holder assembly includes a valve holder configured to allow a portion of the valve to pass therethrough, a valve holder casing configured to receive the valve holder, and an elastic member provided on the valve holder casing and configured to contact the valve holder to prevent movement of the valve.

9 Claims, 11 Drawing Sheets

(58) Field of Classification Search
USPC .............................. 126/39 E, 39 N; 431/256
See application file for complete search history.

(56) References Cited

U.S. PATENT DOCUMENTS

| | | |
|---|---|---|
| 8,079,287 B2 * | 12/2011 | Castillo .................... G05G 1/12 |
| | | 74/553 |
| 9,976,749 B2 | 5/2018 | Yang et al. |
| 10,054,315 B2 | 8/2018 | Choi |
| 2009/0151505 A1 | 6/2009 | Castillo |
| 2011/0265780 A1 | 11/2011 | Ryu |

FOREIGN PATENT DOCUMENTS

| | | |
|---|---|---|
| KR | 10-2015-0128172 A | 11/2015 |
| KR | 10-2016-0041220 A | 4/2016 |

OTHER PUBLICATIONS

Written Opinion of the International Searching Authority dated Mar. 21, 2018 in connection with International Patent Application No. PCT/KR2017/014213, 8 pages.

Korean Intellectual Property Office, "Notice of Preliminary Rejection," dated Feb. 15, 2023, in connection with Korean Patent Application No. 10-2017-0000958, 13 pages.

\* cited by examiner

COOKING APPLIANCE

CROSS-REFERENCE TO RELATED APPLICATIONS

This application is a continuation of U.S. patent application Ser. No. 16/474,334 filed on Jun. 27, 2019, which is a 371 of International Application No. PCT/KR2017/014213 filed on Dec. 6, 2017, which claims priority to Korean Patent Application No. 10-2017-0000958 filed on Jan. 3, 2017, the disclosures of which are herein incorporated by reference in their entirety.

BACKGROUND

1. Field

The present disclosure relates to a cooking appliance, and more particularly, to a cooking appliance that improves the coupling structure of a valve to prevent a valve from moving.

2. Description of Related Art

There may be various types of cooking appliance, but an oven range in which an oven and a cooktop are combined will be described to explain the present disclosure. However, the present disclosure is not limited thereto and is also applicable to a range including only a cooktop.

An oven range includes a cabinet-shaped main body. An oven is provided inside the main body, and a cooktop having at least one heating part is provided on the top of the main body. Electricity or gas is used as a fuel for heating food to be cooked.

In the case of the oven range, a control panel is provided on either the front or the top surface of the main body.

A plurality of buttons, a keypad, a knob unit, and the like may be provided on the control panel to set a cooking mode desired by a user or set various conditions required for cooking. The control panel may include a display to allow the user to check the currently set cooking mode, cooking condition, cooking progress, and the like.

In particular, when the knob unit is located on the control panel, the user may regulate the operation of the main body by rotating the knob unit. Because a coupling shaft of a valve coupled to the knob unit is rotated in the process in which the user rotates the knob unit, the knob unit may be shaken. Also, due to a weight of the knob unit, the knob unit may be tilted downward.

SUMMARY

The present disclosure is directed to providing a cooking appliance in which the coupling structure of a knob unit is improved to maintain the concentricity of the knob unit and prevent shaking.

One aspect of the present disclosure provides a cooking appliance including a main body including a heating part, a valve positioned at least partially inside the main body to supply fuel to the heating part, and a knob unit coupled to the main body to regulate the degree of opening and closing of the valve, wherein the knob unit includes an operating part provided on a front surface of the main body to be operable and to which the valve is coupled at least partially, a valve holder positioned at the rear of the operating part and configured to allow a portion of the valve to pass therethrough, a valve holder casing configured to receive the valve holder, and an elastic member provided on the valve holder casing and configured to contact the valve holder to prevent movement of the valve.

A plurality of the elastic members may be provided to contact the valve holder at a plurality of points to prevent movement of the valve holder.

The elastic members may be provided to contact opposite sides of the valve holder.

The valve holder casing may include an opening provided in a shape corresponding to the valve holder to receive the valve holder.

The valve may include a valve body and a coupling shaft extending from the valve body, and the coupling shaft may be coupled to the knob unit by passing through the main body.

The valve holder may be provided with a valve holder hole through which the coupling shaft passes to prevent movement of the coupling shaft.

The knob unit further may include a sensing member coupled to the valve holder casing and configured to contact the valve holder to detect whether or not the valve is in operation.

The elastic member may be positioned in a first direction of the valve holder casing and the sensing member may be positioned in a second direction different from the first direction of the valve holder casing.

The elastic member may contact a first surface of the valve holder and the sensing member may contact a second surface of the valve holder, and the first surface may be located in the front of the valve holder further than the second surface.

The second surface of the valve holder may be provided with a groove to detect the rotation of the valve holder according to the operation of the valve.

The main body may include a control panel on which the knob unit is disposed.

The valve holder casing may be coupled to the control panel.

The knob unit may further include a seat member in which the valve holder casing is seated and a decorative member surrounding an outer surface of the seat member.

The valve holder casing may be coupled to the control panel by being coupled to the seat member.

Another aspect of the present disclosure provides a cooking appliance including a main body including a heating part, an operating part to regulate fuel supply to the heating part, a valve supplying fuel to the heating part and including a coupling shaft coupled to the operating part, a valve holder positioned at the rear of the operating part and configured to allow the coupling shaft to pass therethrough, and a valve holder casing configured to receive the valve holder and fixing the valve holder to be movable between a first point and a second point different from the first point in order to prevent movement of the coupling shaft, wherein the coupling shaft passes through the valve holder to be coupled to the operating part.

The valve holder casing may include a first elastic member coupled to the first point and a second elastic member coupled to the second point.

The cooking appliance may further include a sensing member coupled to the valve holder casing and configured to detect whether or not the valve is in operation by contacting the valve holder and sensing the operation of the valve holder that is rotated according to the rotation of the coupling shaft.

The first elastic member and the second elastic member may contact a first surface of the valve holder, and the sensing member may contact a second surface of the valve holder positioned further forward than the first surface.

The main body may include a control panel in which the operating part is disposed on the front surface thereof, and the valve holder casing may be coupled to the control panel.

Another aspect of the present disclosure provides a cooking appliance including a main body that includes a heating part, an operating part to operate the heating part, and a control panel on which the operating part is disposed, a valve supplying fuel to the heating part and including a coupling shaft coupled to the operating part, and a valve holder assembly positioned at the rear of the operating part and configured to allow the coupling shaft to pass therethrough, wherein the valve holder assembly fixes the coupling shaft at a first point and a second point different from the first point to prevent movement of the coupling shaft.

According to the embodiments of the present disclosure, the shaking of a knob unit with respect to a control panel and the deviation of the concentricity of the knob unit in one direction can be prevented.

DETAILED DESCRIPTION

Hereinafter, embodiments of the present disclosure will be described in detail with reference to the accompanying drawings. Hereinafter, an oven range including an oven will be described as an example, but the embodiments of the present disclosure is applicable when a control panel is applied to a cooking appliance not including an oven.

Figure 1:
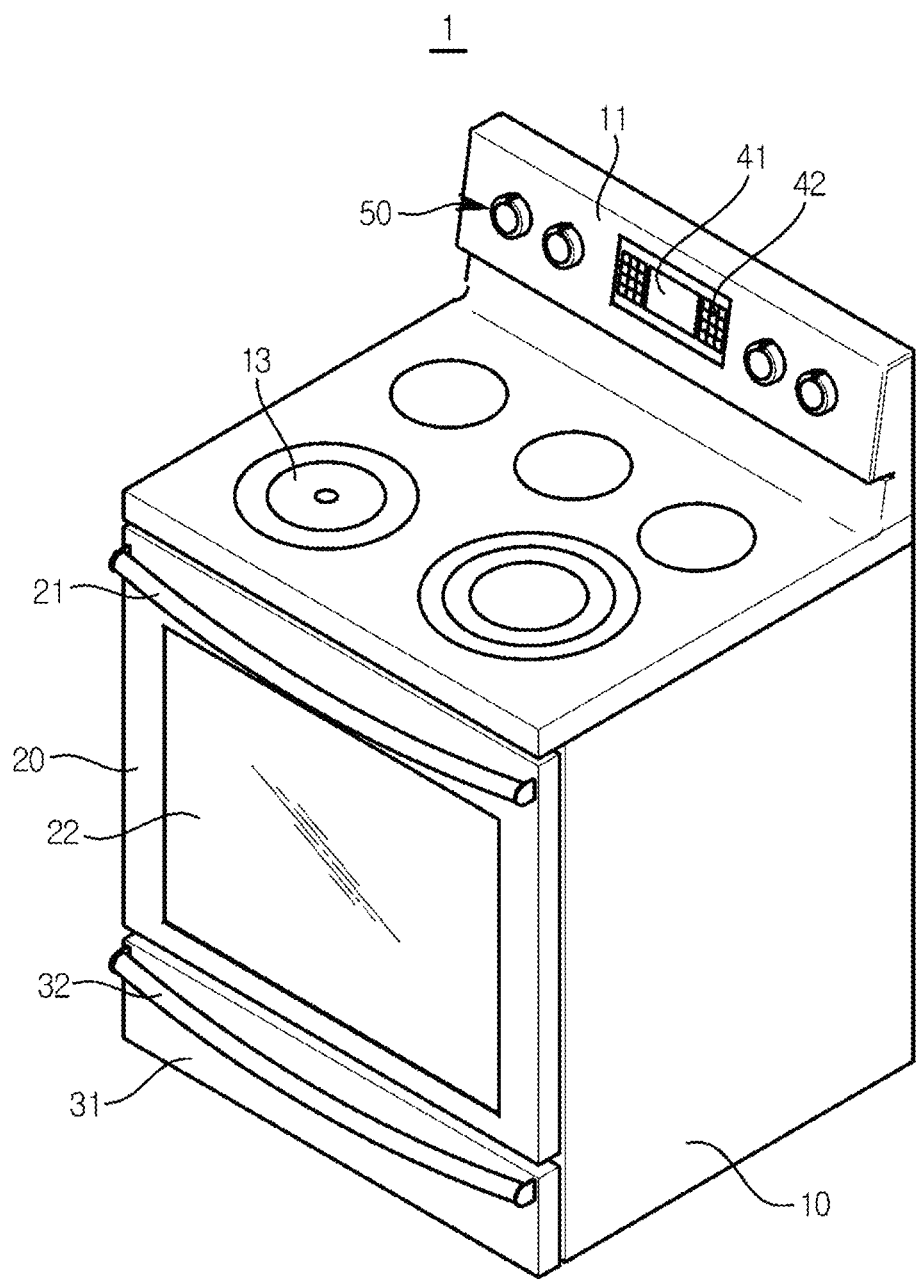
FIG. 1 is a perspective view of a cooking appliance according to an embodiment of the present disclosure.

FIG. 1 is a perspective view of a cooking appliance according to an embodiment of the present disclosure.

As illustrated in FIG. 1, a cooking appliance 1 according to an embodiment of the present disclosure may include an oven and a cooktop. The cooktop may be positioned on a top surface of a main body 10 and the oven may be positioned on a front surface of the main body 10. A cavity (not shown) is formed inside the oven to accommodate food to be cooked and to allow cooking to proceed.

At least a portion of the main body 10 may be provided with a control panel 11 to operate the oven and the cooktop. According to an embodiment of the present disclosure, the control panel 11 may be provided to protrude from an upper portion of the main body 10. The control panel 11 may be provided with a knob unit 50 for operating the cooktop and the oven. According to an embodiment of the present disclosure, four of the knob units 50 may be provided. The control panel 11 may be provided with a display 41 to display the operation states of the oven and the cooktop. Also, the control panel 11 may be provided with operation buttons 42 for more precisely controlling the operation of the cooktop and the oven.

The top surface of the main body 10 may be provided with the cooktop. The cooktop includes a heating part 13 for heating food to be cooked. The heating part 13 is operated by receiving fuel, and electricity or gas may be used as the fuel.

The oven may be provided below the cooktop. The oven may include a door 20 to selectively open or close a front surface of the cavity. The door 20 may be provided with a window 22 through which the cavity may be seen so that the cooking state of the food accommodated in the cavity may be visually observed. The door 20 may be also provided with a handle 21 that may be grasped by the user for opening and closing the door 20.

A storage chamber for storing the cooking utensil and the like may be provided below the oven. The storage chamber may be opened and closed by a drawer 31 which is slidably drawn in and drawn out. The drawer 31 may be provided with a handle 32.

Figure 2:
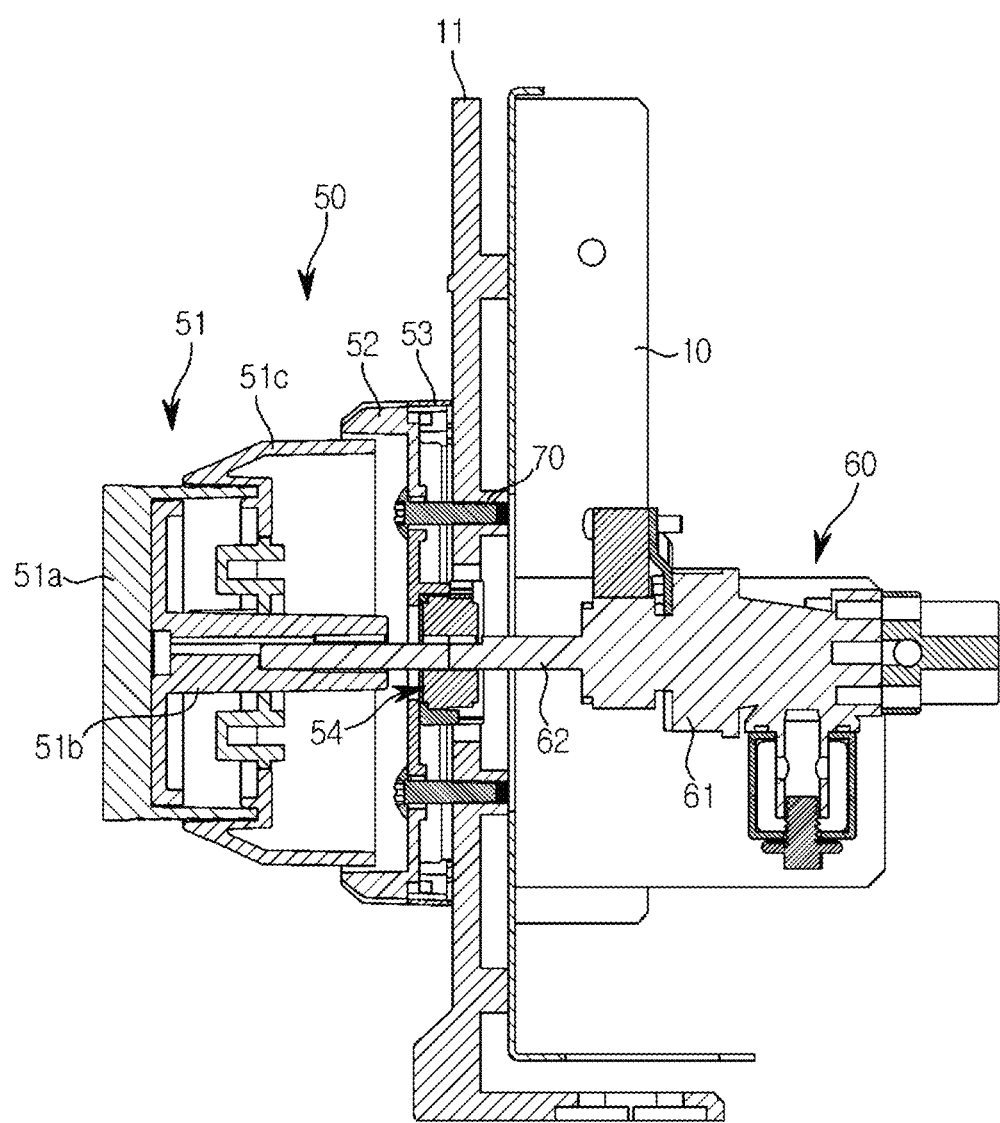
FIG. 2 is a cross-sectional view of a knob unit according to an embodiment of the present disclosure.
Figure 3:
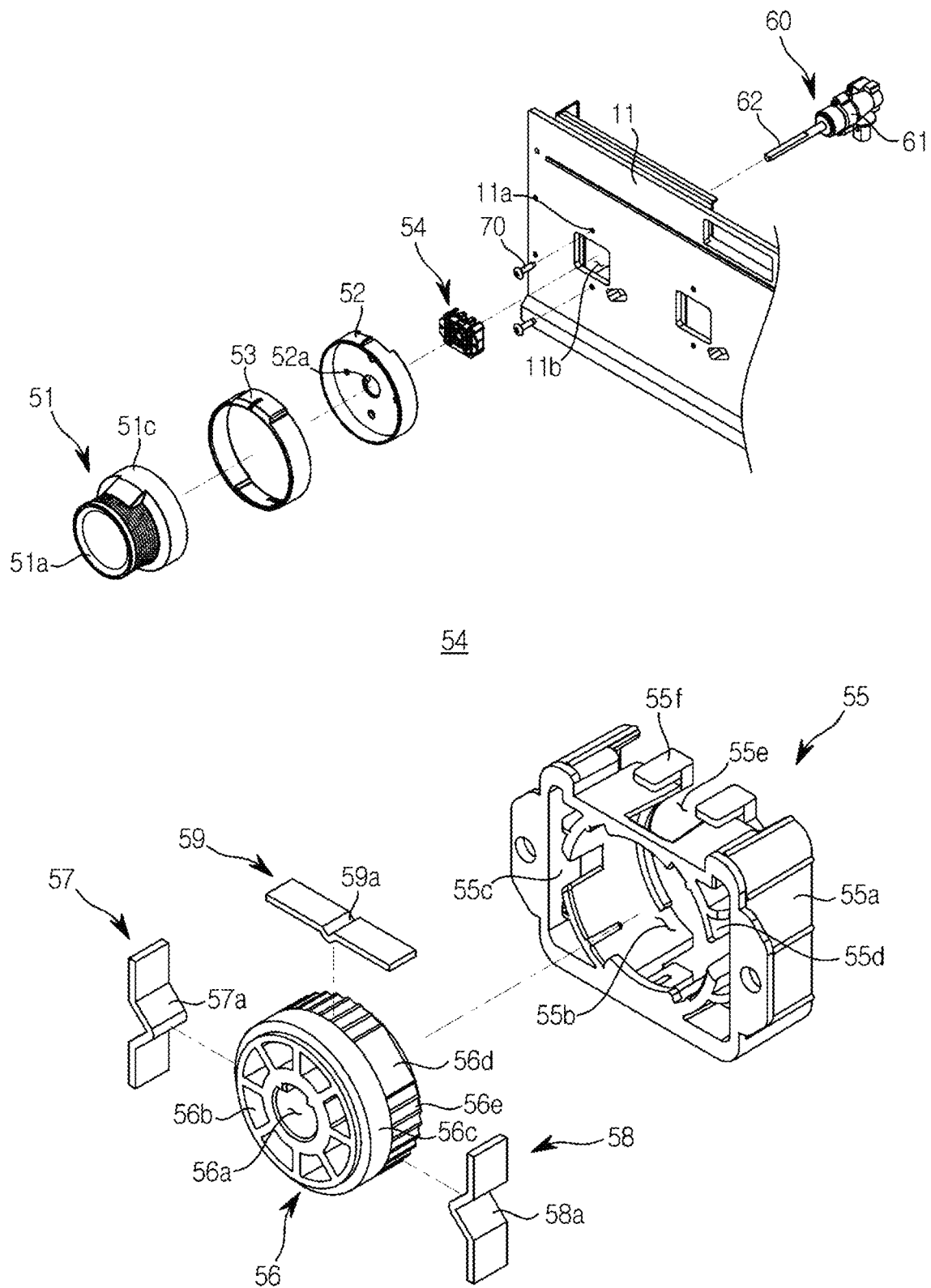
FIG. 3 is an exploded view of the knob unit according to an embodiment of the present disclosure.

FIG. 2 is a cross-sectional view of a knob unit according to an embodiment of the present disclosure, and FIG. 3 is an exploded view of the knob unit according to an embodiment of the present disclosure.

As illustrated in FIGS. 2 and 3, the knob unit 50 is coupled to a valve 60 that supplies fuel to the heating part 13. The valve 60 includes a coupling shaft 62 extending from a valve body 61 and the coupling shaft 62 may be coupled to at least a part of the knob unit 50.

The knob unit 50 includes an operating part 51 provided on the front surface of the main body 10, and a valve holder assembly 54 positioned in the rear of the operating part 51 and configured to allow a portion of the valve 60 to pass therethrough.

The operating part 51 that is provided on the front surface of the main body 10 is provided such that a user may adjust the degree of opening and closing of the valve 60. The user may regulate the supply of fuel to the heating part 13 and the amount of fuel by opening and closing the valve 60 by the operation of the operating part 51. The operating part 51 may include an operating part body 51c, a grasping portion 51a extending to protrude from the operating part body 51c to be grasped by a user, and a coupling groove 51b provided to couple the coupling shaft 62 of the valve 60. The coupling shaft 62 of the valve 60 may be inserted into the coupling groove 51b and coupled to the operating portion 51. Accordingly, when the user rotates the operating part 51, the coupling shaft 62 of the valve 60 coupled to the coupling groove 51b rotates together with the operating part 51 so that the valve 60 may be opened or closed.

The knob unit 50 includes the valve holder assembly 54 for fixing the coupling shaft 62 to prevent the movement of the coupling shaft 62 of the valve 60. The valve holder assembly 54 includes a valve holder 56 configured to allow a portion of the valve 60 to pass therethrough, and a valve holder casing 55 configured to receive the valve holder 56. The coupling shaft 62 of the valve 60 is coupled to the operating part 51 by passing through a valve holder hole 56a provided in the valve holder 56. The specific configuration of the valve holder assembly 54 will be described later.

The knob unit 50 may further include a seat member 52 in which the valve holder casing 55 is seated, and a decorative member 53 surrounding an outer surface of the seat member 52. The seat member 52 may be provided with a seat part hole 52a through which the coupling shaft 62 of the valve 60 passes. A light emitting part (not shown) that emits light when the knob unit 50 is operated may be seated in the seat member 52.

The valve holder assembly 54, in which the valve holder 56 is received in the valve holder casing 55, may be coupled to the seat member 52. The seat member 52, to which the valve holder assembly 54 and the decorative member 53 are coupled, may be coupled to the control panel 11 through fastening members 70. However, the present disclosure is limited thereto, and the valve holder assembly 54, in which the valve holder 56 is received in the valve holder casing 55, may be directly coupled to the control panel 11 without the seat member 52. The control panel 11 may include a seat part coupling portion 11b provided with an opening to couple the seat member 52. Also, fastening member coupling holes 11a may be provided on upper and lower portions of the seat part coupling portion 11b to couple the fastening members 70.

Figure 4:
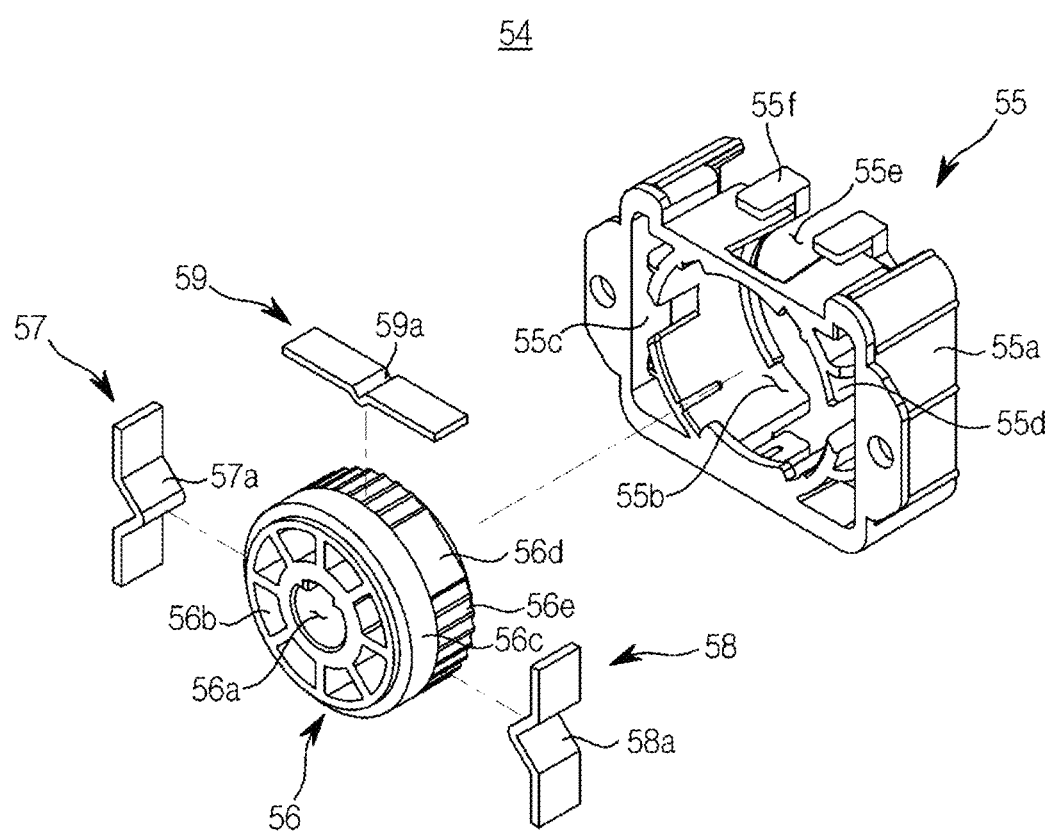
FIG. 4 is an exploded view of a valve holder assembly according to an embodiment of the present disclosure.
Figure 5:
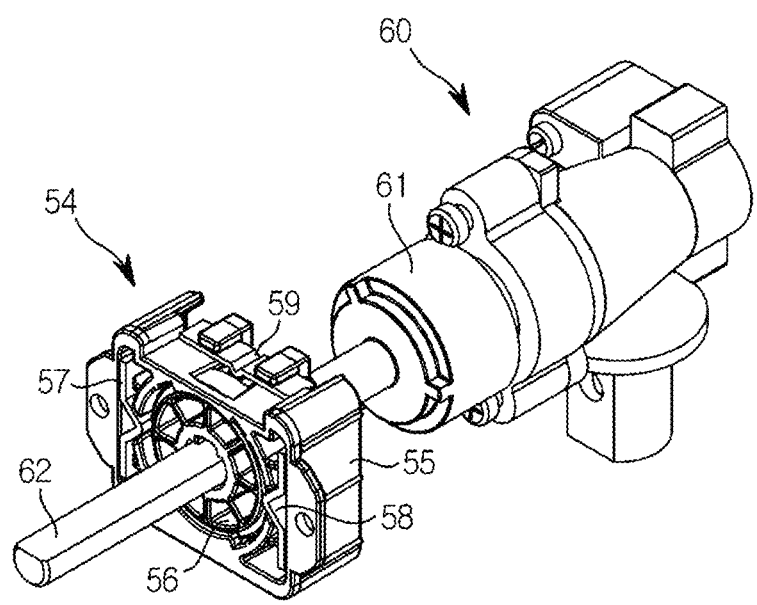
FIG. 5 is a view illustrating a state where a valve is coupled to the valve holder assembly according to an embodiment of the present disclosure.
Figure 6:
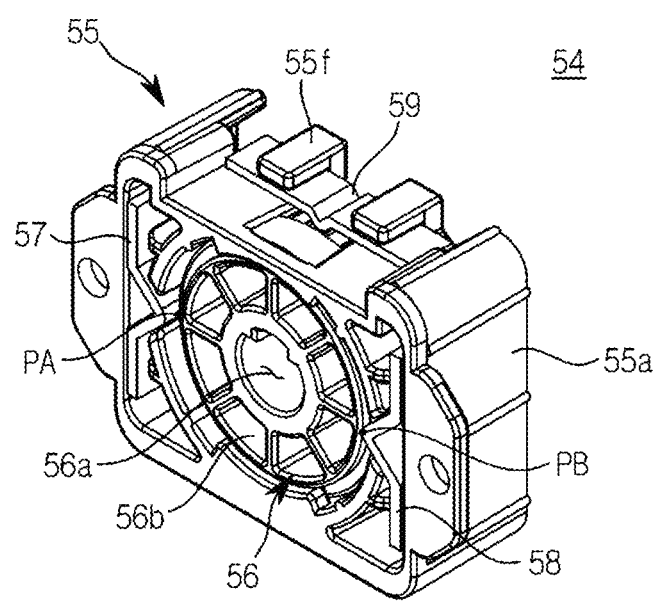
FIG. 6 is a perspective view of the valve holder assembly according to an embodiment of the present disclosure.
Figure 7:
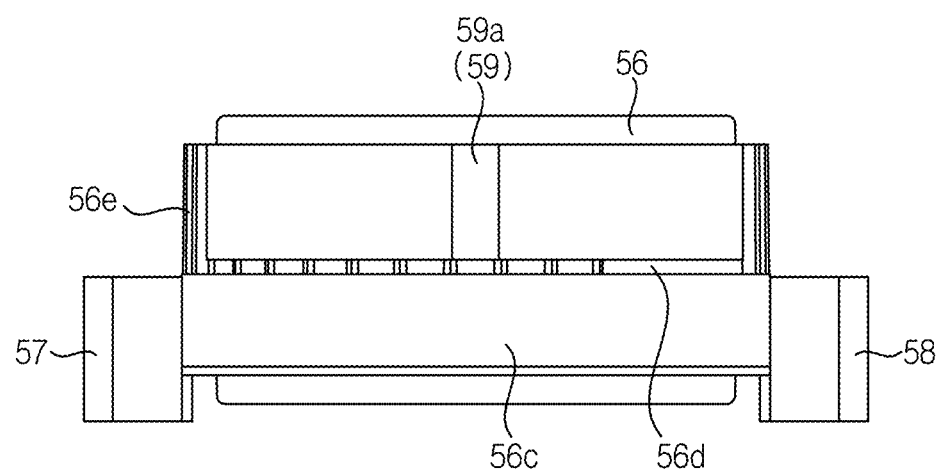
FIG. 7 is a top view of the valve holder assembly according to an embodiment of the present disclosure, in which a valve holder casing is removed.

FIG. 4 is an exploded view of a valve holder assembly according to an embodiment of the present disclosure, FIG. 5 is a view illustrating a state where a valve is coupled to the valve holder assembly according to an embodiment of the present disclosure, FIG. 6 is a perspective view of the valve holder assembly according to an embodiment of the present disclosure, and FIG. 7 is a top view of the valve holder assembly according to an embodiment of the present disclosure, in which a valve holder casing is removed.

As illustrated in FIGS. 4 to 7, the valve holder assembly 54 includes the valve holder 56 through which the coupling shaft 63 of the valve 60 passes, and the valve holder casing 55 to receive the valve holder 56.

The valve holder hole 56a through which the coupling shaft 62 of the valve 60 passes may be provided on the valve holder 56. The valve holder hole 56a may be provided at a central axis of the valve holder 56. The valve holder 56 may be provided with holes 56b for fluidity in molding the valve holder 56 in addition to the valve holder holes 56a.

An opening 55b may be provided on the valve holder casing 55 to receive the valve holder 56. Elastic members 57 and 58 configured to contact the valve holder 56 at a plurality of points may be provided in the valve holder casing 55 to prevent the movement of the valve 60. The elastic members 57 and 58 may be in contact with the valve holder 56 at a first point PA and may be in contact with the valve holder 56 at a second point PB different from the first point PA. According to an embodiment of the present disclosure, the elastic members 57 and 58 and the valve holder 56 are in contact with each other at two points, but not limited thereto, and the elastic members 57 and 58 and the valve holder 56 may be in contact with each other at a plurality of points. The first point PA and the second point PB may be provided at positions opposite to each other.

According to an embodiment of the present disclosure, the elastic members 57 and 58 may include two of the first elastic member 57 and the second elastic member 58, but the present disclosure is not limited thereto. The first elastic member 57 and the second elastic member 58 may be coupled to opposite sides of the valve holder casing 55, respectively, but not limited thereto. As an example, the first elastic member 57 and the second elastic member 58 may be coupled to upper and lower portions of the valve holder casing 55, respectively. The first elastic member 57 and the second elastic member 58 may be formed in a plate spring shape. The first elastic member 57 and the second elastic member 58 may have bent portions 57a and 58a bent in the direction of the valve holder 56 so as to be in contact with the valve holder 56, respectively. According to an embodiment of the present disclosure, the bent portions 57a and 58a may be provided at a central portion of the first and second elastic members 57 and 58.

The valve holder casing 55 may be provided with a first receiving groove 55c and a second receiving groove 55d for receiving the first elastic member 57 and the second elastic member 58, respectively. The first receiving groove 55c and the second receiving groove 55d may be formed in a shape corresponding to the first elastic member 57 and the second elastic member 58. According to an embodiment of the present disclosure, because the first elastic member 57 and the second elastic member 58 are coupled to the opposite sides of the valve holder casing 55, the first receiving groove 55c and the second receiving groove 55d may be provided at the opposite sides of the valve holder casing 55. Because the first and second elastic members 57 and 58 contact the valve holder 56 at the first point PA and the second point PB, the valve holder 56 is movable between the first point PA and the second point PB while preventing the valve holder 56 from deviating from the first point PA and the second point PB. Accordingly, the coupling shaft 62 of the valve 60 passing through the valve holder 56 does not deviate from the first point PA and the second point PB so that the coupling shaft 62 of the valve 60 may be prevented from being shaken out of a certain range. In addition, the concentricity of the knob unit 50 may be maintained.

The valve holder casing 55 may be provided with a sensing member 59 configured to contact the valve holder 56 and sense the operation of the valve 60. The sensing member 59 may detect whether or not the valve 60 is in operation by sensing the operation of the valve holder 56 that is rotated according to the rotation of the coupling shaft 62 of the valve 60. According to an embodiment of the present disclosure, the sensing member 59 is coupled to an upper portion of the valve holder casing 55, but not limited thereto, and may be coupled to a side of the valve holder casing 55. The valve holder casing 55 is provided with a third receiving groove 55e to receive the sensing member 59, and the third receiving groove 55e may be formed in a shape corresponding to the sensing member 59. According to an embodiment of the present disclosure, when the sensing member 59 is coupled to the upper portion of the valve holder casing 55, a rib 55f may be provided to fix the sensing member 59.

The sensing member 59 may be provided with a bent portion 59a for contact with the valve holder 56. The valve holder 56 may be provided with a groove 56e having a shape corresponding to the bent portion 59a of the sensing member 59. The valve holder 56 is rotated according to the rotation of the coupling shaft 62 of the valve 60, and thus the user may recognize the rotation of the valve 60 by the sound and tactile feeling generated when the groove 56e of the valve holder 56 contacts the bent portion 59a of the sensing member 59.

The first and second elastic members 57 and 58 may be positioned in a first direction of the valve holder casing 55 and the sensing member 59 may be positioned in a second direction different from the first direction of the valve holder casing 55. That is, when the first and second elastic members 57 and 58 are coupled in the vertical direction with respect to the valve holder casing 55, the sensing member 59 may be coupled in the horizontal direction of the valve holder casing 55, and the opposite is also possible.

The valve holder 56 may include a first surface 56c and a second surface 56d. The first surface 56c may be positioned in the front of the valve holder 56 further than the second surface 56d. That is, the minimum distance between the first surface 56c of the valve holder 56 and the valve holder hole 56a is smaller than the minimum distance between the second surface 56d of the valve holder 56 and the valve holder hole 56a. The first and second elastic members 58 and 59 may contact the first surface 56c of the valve holder 56. The sensing member 59 may contact the second surface 56d of the valve holder 56. The groove 56e for contacting the sensing member 59 may be provided on the second surface 56d.

Figure 8:
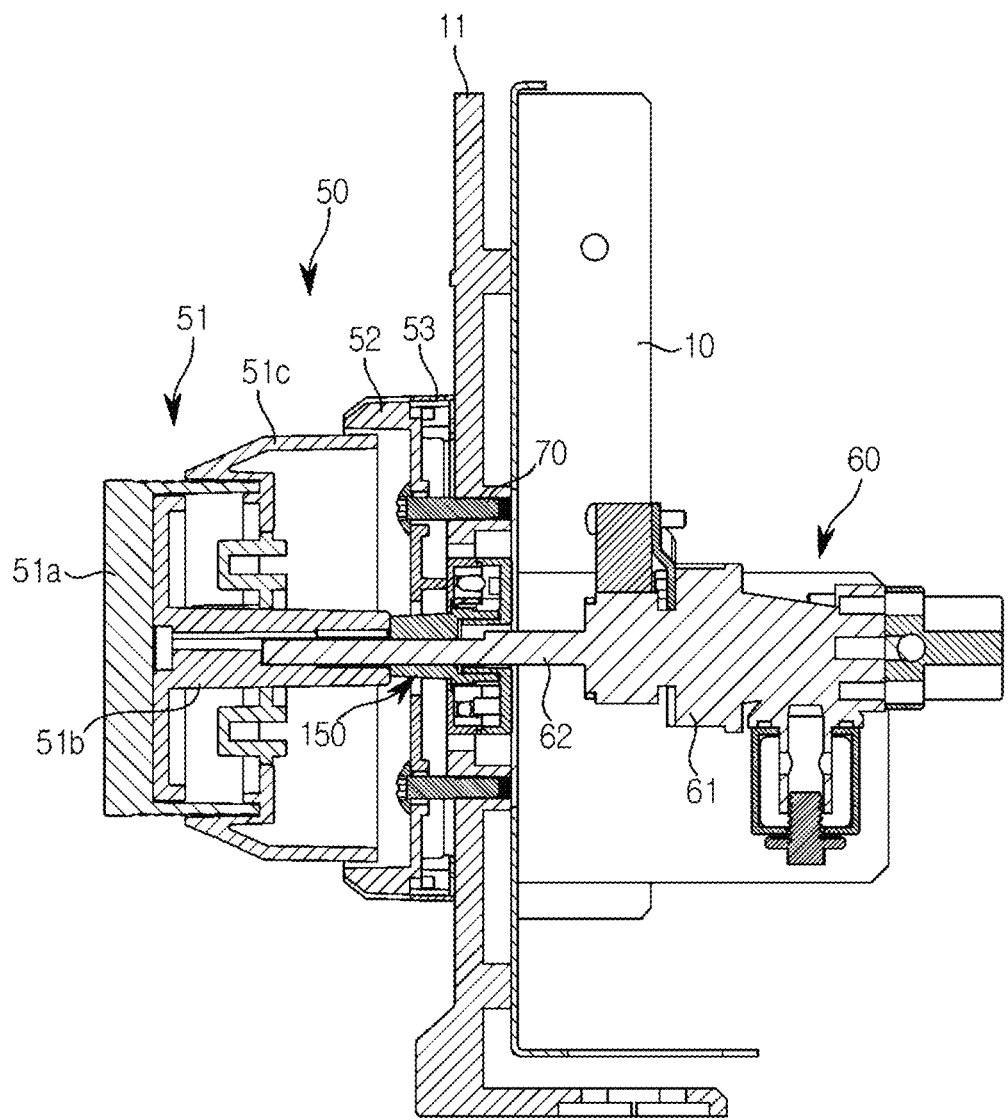
FIG. 8 is a cross-sectional view of a knob unit according to another embodiment of the present disclosure.
Figure 9:
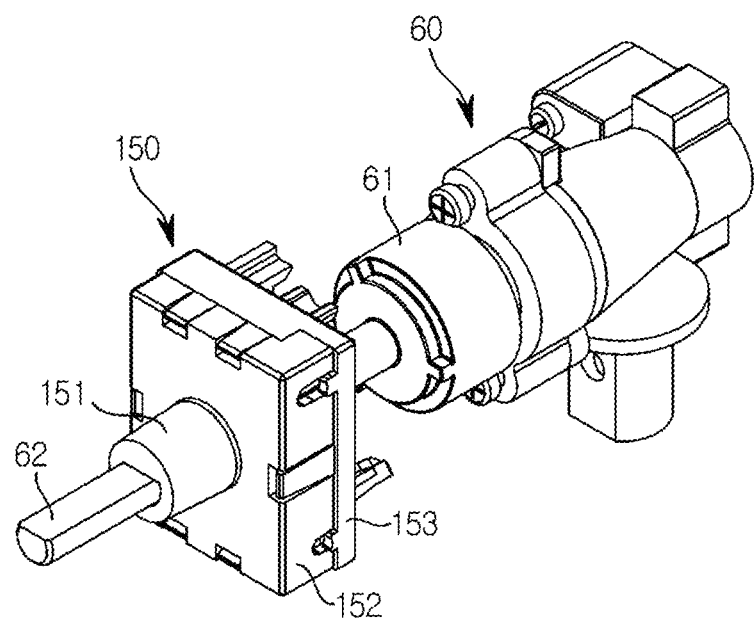
FIG. 9 is a view illustrating a state where a valve is coupled to a valve holder assembly according to another embodiment of the present disclosure.

FIG. 8 is a cross-sectional view of a knob unit according to another embodiment of the present disclosure, and FIG. 9 is a view illustrating a state where a valve is coupled to a valve holder assembly according to another embodiment of the present disclosure.

As illustrated in FIGS. 8 and 9, the valve 60 includes the coupling shaft 62 extending from the valve body 61 and the coupling shaft 62 may be coupled to at least a part of the knob unit 50.

The knob unit 50 includes the operating part 51 provided on the front surface of the main body 10, and a valve holder assembly 150 positioned in the rear of the operating part 51 and configured to allow a portion of the valve 60 to pass therethrough.

The operating part 51 illustrated in FIGS. 8 and 9 is the same as the operating part illustrated in FIGS. 2 and 3, and thus a description thereof will be omitted.

The valve holder assembly 150 according to an embodiment of the present disclosure may include a head part 151 coupled to the coupling shaft 62 and body parts 152 and 153 to which the head part 151 is coupled.

Figure 10:
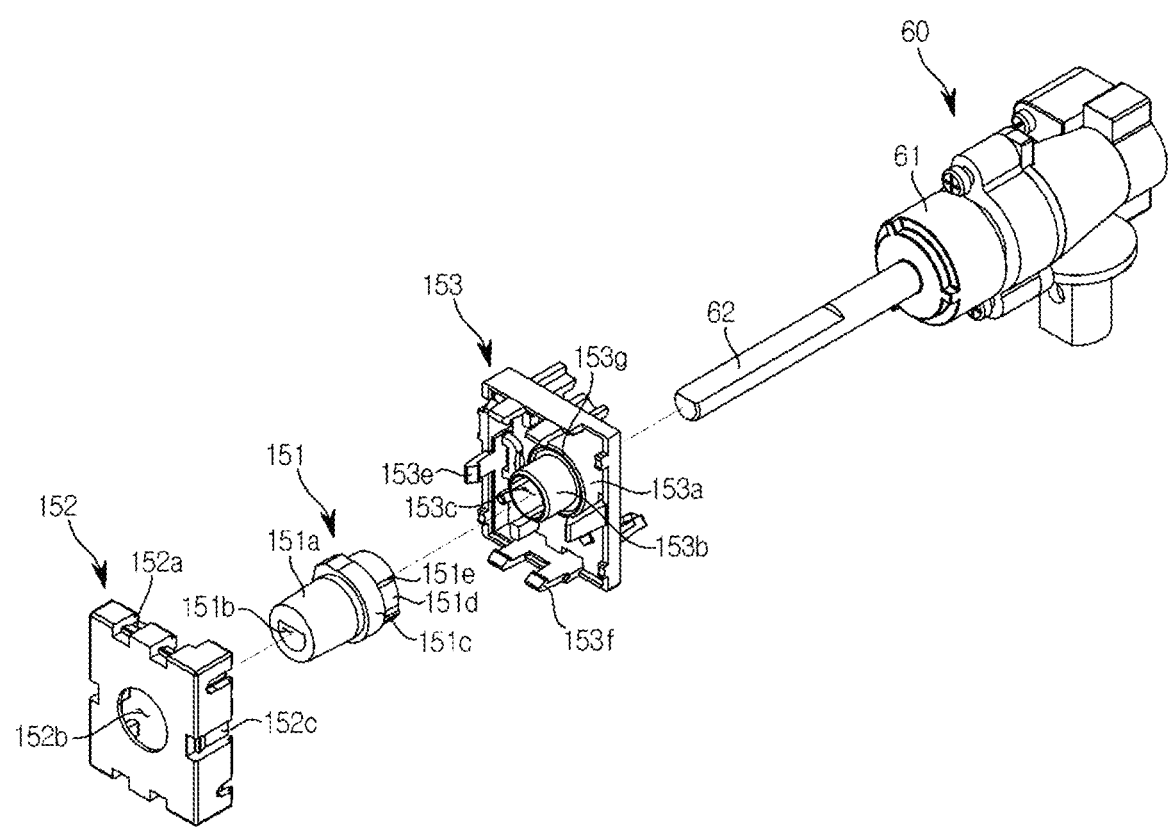
FIG. 10 is an exploded view illustrating a state in which the valve holder assembly and the valve according to another embodiment of the present disclosure are disassembled.
Figure 11:
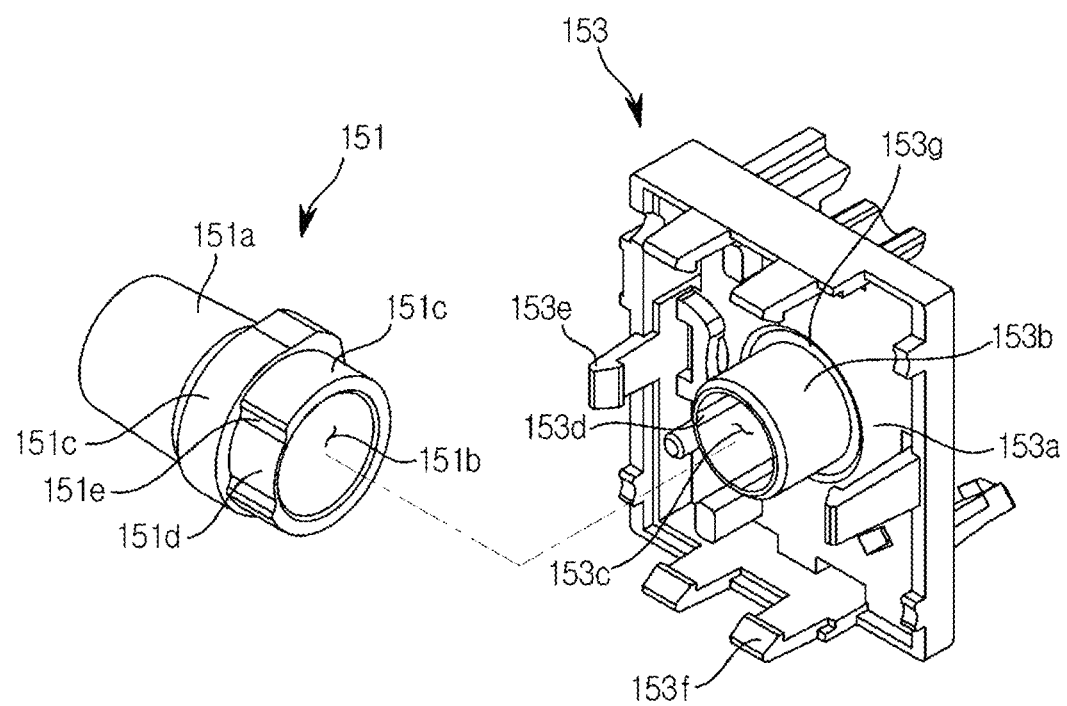
FIG. 11 is an exploded view of the valve holder assembly according to another embodiment of the present disclosure.

FIG. 10 is an exploded view illustrating a state in which the valve holder assembly and the valve according to another embodiment of the present disclosure are disassembled, and FIG. 11 is an exploded view of the valve holder assembly according to another embodiment of the present disclosure.

As illustrated in FIGS. 10 and 11, the body parts 152 and 153 of the valve holder assembly 150 may be composed of two body parts which are the first body part 152 and the second body part 153. A body part positioned at the front of the valve holder assembly 150 is defined as the first body part 152 and a body part coupled to the rear of the first body part 152 is defined as the second body part 153.

The first body part 152 may be provided with an opening 152b to allow the head part 151 to protrude therethrough. The head part 151 may pass through the opening 152b of the first body part 152 to be coupled to the first body part 152. The second body part 153 may be inserted into the opening 151b of the head part 151. The second body part 153 may include a boss 153b protruding forward. The boss 153b may be inserted into the opening 151b of the head part 151. The coupling shaft 62 of the valve 60 is inserted into a hole 153c of the boss 153b of the second body part 153 and passes through the opening 151b of the head part 151, so that the coupling shaft 62 of the valve 60 may be coupled to the valve holder assembly 150.

The second body part 153 may be provided with a seat portion 153g to seat the head part 151. The boss 153b may be provided to extend from a base 153a of the second body part 153, and the seat portion 153g may be formed in a stepped shape between the boss 153b and the base 153a to seat a coupling portion 151d of the head part 151, which will be described later.

The head part 151 may include the coupling portion 151d provided to surround the boss 153b of the second body part 153. The head part 151 may also include a separation preventing portion 151c to prevent the head part 151 from separating from the opening 152b of the first body part 152. The separation preventing portion 151c may be provided to protrude in a circumferential direction with respect to the coupling portion 151d of the head part 151. The head part 151 may include a protruding portion 151a provided to protrude with respect to the first body part 152 to surround the coupling shaft 62 of the valve 60. The separation preventing portion 151c may be provided at a boundary between the protruding portion 151a and the coupling portion 151d. Because the cross sectional area of the separation preventing portion 151c is provided to be larger than the cross sectional area of the protruding portion 151a and the coupling portion 151d and the cross sectional area of the opening 152b of the first body part 152, the head part 151 may be prevented from being separated from the opening 152b of the first body part 152.

The second body part 153 may be provided with body part ribs 153e and 153f for coupling with the first body part 152. According to an embodiment of the present disclosure, one of the body part rib 153e is provided on opposite sides of the second body part 153, respectively, and two of the body part ribs 153f are provided on upper and lower portions of the second body part 153, respectively, but the present disclosure is not limited thereto. The first body part 152 may be provided with body part coupling grooves 152a and 152c for coupling with the second body part 153 corresponding to the respective body part ribs 153e and 153f. Accordingly, one of the body part coupling groove 152c is provided on opposite sides of the first body part 152, respectively, and two of the body part coupling grooves 152a are provided on upper and lower portions of the first body part 152, respectively.

At least one boss coupling groove 153d provided in a longitudinal direction along the inner surface of the boss 153b may be provided inside the boss hole 153c of the second body part 153. According to an embodiment of the present disclosure, a total of four of the boss coupling grooves 153d may be provided, but the present disclosure is not limited thereto. Also, the coupling portion 151c of the head part 151 may be provided with a head part rib 151d provided to be fitted in the boss coupling groove 153d of the boss 153b. The shape and the number of the head part ribs 151e may correspond to the shape and the number of the boss coupling grooves 153d. Because the head part rib 151e is fitted in the boss coupling groove 153d so that the head part 151 and the second body part 153 are coupled with each other, the head part 151 and the boss 153b may be stably coupled with each other so that the shaking of the coupling shaft 62 of the valve 60 passing through the second body part 153 and the head part 151 may be reduced.

The coupling shaft 62 of the valve 60 may be coupled to the operating part 51 by passing through the head part 151 through the second body part 153. The head part 151 of the valve holder assembly 150 may be coupled to the second body part 153. The head part 151 may be provided to protrude with respect to the front surface of the first and second body parts 152 and 153. Therefore, the area where the coupling shaft 62 of the valve 60 is fixed may be increased as compared with the conventional one, and thus the shaking of the coupling shaft 62 of the valve 60 may be prevented.

While the present disclosure has been particularly described with reference to exemplary embodiments, it should be understood by those of skilled in the art that various changes in form and details may be made without departing from the spirit and scope of the present disclosure.

What is claimed is:

1. A cooking appliance comprising:
   a main body including a heating part;
   a valve positioned at least partially inside the main body to supply fuel to the heating part and including a coupling shaft; and
   a knob unit coupled to the main body to regulate a degree of opening and closing of the valve, wherein the knob unit includes:
      an operating part provided on a front surface of the main body to be operable and to which the valve is coupled at least partially; and
      a valve holder assembly positioned at a rear of the operating part and provided to allow the coupling shaft to pass therethrough;
   wherein the valve holder assembly comprises first and second elastic members configured to contact the coupling shaft at a first point and a second point different from the first point so that the coupling shaft is movable between the first elastic member and the second elastic member to prevent the coupling shaft from being deviated out of a certain range when the operating part is operated by a user.

2. The cooking appliance of claim 1, wherein the valve holder assembly includes:
   a head part configured to be coupled to the coupling shaft; and
   a body part to which the head part is coupled.

3. The cooking appliance of claim 2, wherein the body part includes:
   a first body part positioned on a front surface of the valve holder assembly; and
   a second body part coupled to a rear side of the first body part.

4. The cooking appliance of claim 3, wherein:
   the first body part includes an opening formed to allow the head part to be coupled thereto, and
   the head part is coupled to the first body part through the opening.

5. The cooking appliance of claim 4, wherein the head part includes:
   a protruding part provided to surround the coupling shaft;
   a coupling part coupled to the second body part; and
   a separation preventing part provided on a boundary between the protruding part and the coupling part.

6. The cooking appliance of claim 5, wherein the separation preventing part has a cross section larger than a cross section of each of the protruding part and the coupling part.

7. The cooking appliance of claim 5, wherein the second body part includes:
   a boss formed to protrude forward and inserted into an opening of the head part;
   a boss hole formed through the boss such that the coupling shaft of the valve passes through the boss hole; and
   a seating part provided to seat the head part thereon.

8. The cooking appliance of claim 7, wherein:
   the boss hole is provided at an inner side with at least one boss coupling groove arranged in a length direction along an inner surface of the boss, and
   the coupling part of the head part is provided with at least one head part rib corresponding to the at least one boss coupling groove.

9. The cooking appliance of claim 8, wherein the coupling shaft is configured to come in contact with the at least one boss coupling groove by the head part rib at a plurality of points to prevent the valve from moving.

* * * * *